United States Patent [19]

Chorney

[11] 3,725,467
[45] Apr. 3, 1973

[54] RECOVERY OF CALCIUM MAHOGANY SULFONATE

[76] Inventor: Frederick R. Chorney, 5703 Oliva St., Lakewood, Calif. 90712

[22] Filed: Mar. 23, 1970

[21] Appl. No.: 22,019

[52] U.S. Cl. ............................................. 260/504 A
[51] Int. Cl. ............................................. C07b 13/00
[58] Field of Search ....................... 260/504 R, 504 A

[56] References Cited

UNITED STATES PATENTS

| | | | |
|---|---|---|---|
| 2,559,503 | 7/1971 | Harlan | 260/504 R |
| 3,213,131 | 10/1965 | Benedict | 260/504 R |
| 3,023,231 | 2/1962 | Logan | 260/504 A |
| 3,084,119 | 4/1963 | Cabbage | 260/504 A |
| 2,459,995 | 1/1949 | Duncan et al. | 260/504 A |

OTHER PUBLICATIONS

C.R.C. Handbook (44th Ed. 1963) pp. 550–555.

C.R.C. Handbook (50th Ed. 1969) pp. D-118-119.

*Primary Examiner*—Leon Zitver
*Assistant Examiner*—L. B. DeCrescente
*Attorney*—Delmar H. Larsen

[57] ABSTRACT

A by-product of the production of mahogany petroleum sulfonate is a filter cake comprising calcium mahogany sulfonate, lime in various forms, and a filter aid such as diatomaceous earth, generally containing about half its weight of mahogany sulfonate. This by-product is generally discarded. The invention provides a method for the economical recovery of the mahogany sulfonate by a process involving the addition of water and a strong acid having a soluble calcium salt, which permits stratification to take place. The so-formed slurry is subjected to the action of gravity as by standing or passing through a centrifuge or a hydrocyclone, which permits the calcium mahogany sulfonate to be recovered, and if desired, to be subsequently purified.

5 Claims, No Drawings

RECOVERY OF CALCIUM MAHOGANY SULFONATE

This invention relates to the recovery of calcium mahogany sulfonate from filter cake residues.

In the refining of petroleum oils, it is customary to treat certain fractions with fuming sulfuric acid or sulfur trioxide, which gives rise among other things to the production of petroleum sulfonates. These are generally classified into the so-called green acids, which are essentially water soluble, and the so-called mahogany acids, also known as mahogany petroleum sulfonates, particularly when in the salt form. The mahogany sulfonates are essentially oil soluble, as contrasted with the green acids, and in general have higher ranges of molecular weights than the green acids. Mahogany sulfonates also may be made by sulfonation of alkylated aromatics such as alkyl benzene.

The mahogany sulfonates are commercially valuable, and find extensive use for their surface active properties. For example, they are used as detergents and dispersants in motor oils, where they act as rust preventives and high-base neutralizers of engine acid.

For many purposes, the mahogany sulfonate is recovered from the treated oil, or the sulfonated alkyl aromatic, in the form of its calcium salt, the so-called calcium mahogany sulfonate. A common additional step involves the "high-basing" of the product by addition of 2 or 3 percent by weight of calcium oxide or calcium hydroxide to the calcium mahogany sulfonate, together with a small amount of water or alcohol, or both, followed by heating the mixture to about 325° F. The thus stripped product, which retains a portion of the added lime, is then filtered, generally with the employment of a filter aid which is common diatomaceous earth, but which also may be asbestos or a mixture of the two. The filtrate is the desired product, and especially in the "high-base" form is useful in neutralizing acids such as may occur during prolonged use of lubrication oil.

However, a considerable amount of the calcium mahogany sulfonate remains entrained in the filter cake, the solids of which comprise that portion of the lime not retained by the filtrate and whatever filter aid has been used. In spite of the fact that such filter cakes commonly contain about 50 percent by weight of inherently valuable calcium mahogany sulfonate, the cake is generally discarded when filtration becomes slow because of the impracticality of recovering the residual calcium mahogany sulfonate, which is bound tightly into the mud formed by sulfonate, insoluble lime, and filter aid.

An object of my invention is to provide an effective, economical, and procedurally simple method of recovering calcium mahogany sulfonate from a filter cake of the type described.

Other objects of the invention will appear as the description thereof proceeds.

Generally speaking and in accordance with an illustrative embodiment of my invention, to a filter cake comprising calcium mahogany sulfonate, calcium hydroxide, calcium carbonate, and any filter aid which may be present, I add an acid having an ionization constant of at least $1.00 \times 10^{-2}$ and the calcium salt of which is water soluble, in a quantity sufficient to neutralize the calcium hydroxide and the calcium carbonate to form aqueous solution of the salt formed by the action of the acid in the calcium hydroxide and the calcium carbonate, adding water where necessary to obtain a fluid mixture. The preferred density of the so-formed aqueous salt solution is about 1.1 to 1.2 gms/ml, but other densities are operable. I then subject the fluid reaction mixture so formed to the action of gravity so as to cause three layers to form, consisting of a top layer of calcium mahogany sulfonate, an intermediate layer of a brine of the salt already described, and a lower layer of the non-solubilized solids (such as the filter aid solids) in the brine. Typical densities for the three layers are about 1.0 for the top, about 1.1 to 1.2 for the intermediate, and about 1.3 to 1.8 for the bottom. After this three-layer stratification has formed, I then separate the top layer of the calcium mahogany sulfonate. The solids may be recovered from the bottom layer if desired by washing and/or drying, and they may then be reused.

While the top layer thus removed is commercially valuable as such, for some uses it is desired to have a more highly purified product; so that after having removed this layer, I may optionally subject it to a purification step, for which I prefer to dilute it with at least half its volume of a liquid hydrocarbon solvent such as xylene or naphtha having a distillation endpoint under 300° F. I then water-wash the so-diluted mixture so as to remove any entrained brine which may be present.

The thus water-washed product may be used in that state for many commercial uses, particularly where minor contents of water and of hydrocarbon solvent are not objectionable. However, for most uses it is preferred to add from 2 to 3 percent by weight of lime in the form of quicklime or hydrated lime to the product to insure complete conversion of all sulfonic acid to calcium sulfonate, and then to heat to about 325° F. so as to strip off water and solvent and filter.

The acids which may be used and which conform to the prerequisites already stated include hydrochloric acid, nitric acid, and trichloroacetic acid. Of these, hydrochloric acid is by far the most practical, because of its low cost and availability. Examples of acids which are outside of the scope of the invention and which in fact are not operative are acetic acid, phosphoric acid, and sulfuric acid. While acetic acid forms a water soluble calcium salt, its ionization constant is too low to be operative in the invention. Phosphoric and sulfuric acids are inoperative because their calcium slats are insoluble; moreover, phosphoric acid again is too weakly ionized.

The filter aid which may be present is almost universally diatomaceous earth. Alternatively, it may be mixed with or replaced by asbestos, although this seldom occurs because of cost considerations.

Where concentrated hydrochloric acid is used, it is in general necessary to add some water in order to obtain a fluid mixture. However, if diluted hydrochloric acid were used, then the water necessary to obtain a fluid mixture would be added in that form.

The period of time necessary for gravity to cause the three layers to form in accordance with the invention will naturally vary with conditions, such as for example the amount of water initially added; the temperature at which stratification takes place, the nature and dimensions of the settling vessel, and the like. In general, where simple settling is employed, the commencement of stratification is evident after a relatively few minutes, such as 15 or 20. After several hours, the stratification into three distinct layers will have become very definite. In order to obtain the optimum yield of recovered sulfonate and in as uncontaminated a form as possible, I prefer to allow most of the mixtures made up in accordance with the invention to stand for about 24 hours. Shorter times, such as 8 hours, will generally have an adverse effect upon the yield, whereas longer settling times, such as 48 hours or more generally give so little further increase in yield over the 24-hour product that tying up the equipment and materials for an additional day is not economically justified.

An example of the operation of the invention will now be given. 400 grams of calcium mahogany sulfonate filter cake from a commercial operation are mixed with 400 grams of water and 200 grams of commercial hydrochloric acid (32 percent) is added. The mixture thus formed is stirred for about 15 minutes in order to insure thorough mixing. The mixture is then placed in a 1-liter laboratory glass beaker. Some separation is immediately evident, and after 15 minutes, for example, two sharply defined layers are evident. After standing for about 1 hour, a third layer of calcium chloride brine commences to become evident intermediate the two layers already formed. After 8 hours, the middle layer of clear brine has increased in size and all layers are more obviously different in character from each other. After 24 hours, the intermediate layer is even greater in extent, and the physical separation can be made. As already explained, the top layer containing the calcium mahogany sulfonate to be recovered is removed, as by siphoning. In this example, the density of the mahogany sulfonate was approximately 1.0 and the density of the middle brine layer was 1.14.

The yield of calcium mahogany sulfonate obtained in this test was determined by assay, and was about 42 percent by weight of the weight of the cake, which in turn represented a recovery efficiency of about 95 percent by weight. Thus, only about 5 percent of the originally present mahogany sulfonate was not recovered.

While I do not wish to be limited to any theory of operation, I believe that by dissolving the lime imbedded in the interstices of the diatomaceous earth my inventive process enables the release of the sulfonate that clings to the large surface area of the lime. The reaction of the acid and the lime gives rise to an aqueous solution of a salt which rejects the less dense sulfonate by the action of the density difference between the sulfonate and the salt solution coupled with the emulsion-breaking characteristic of this salt solution.

In an additional optional series of steps, the mahogany sulfonate recovered as described was mixed with an equal volume of petroleum solvent of the grade known as "V.M. & P. naphtha," water was mixed in and allowed to separate, the water was removed using a separatory funnel, and the product was then relimed with 2.5 percent of its weight of calcium hydroxide, which was added with thorough stirring. The product was then heated to 325° F. until all residual solvent and water had been evaporated and then filtered leaving a high quality recovered product.

When, in the initial step of my invention, the starting material is mixed with water and acid, the neutralization of the alkaline components with the acid naturally leads to an increase in temperature, as result of the well-known heat of neutralization occurring when an acid and a base are allowed to react. Accordingly, the so-formed mixture will increase in temperature, by about 40° or 50° F., depending on the base and acid necessary to neutralize. This increase in temperature is by no means disadvantageous because the resulting lower viscosity of the so-heated liquid phases of the mixture accelerates the separation and stratification process. Thus, in large scale operation, there is no need to provide for any cooling of the reaction mixture during stratification.

As in any operation where gravity brings about a separation of constituents in a slurry, the relatively weak gravitational field of the earth may be augmented by centrifuging. Thus, it is within the scope of my invention either to use normal gravity to bring about the stratification, or employ the much higher gravitational fields obtainable in commercial centrifuges and hydrocyclones to effect a separation of the calcium mahogany sulfonate layer in the process of the invention. When a centrifuge is used, those providing for a positive displacement from the centrifuge of the heavier constituents of the feed are to be preferred. These are sometimes called "decanting centrifuges" and are commercially available in many sizes. Typical positive displacement centrifuges are shown in U.S. Pat. No. 2,679,974 and 1,934,406.

The enhanced gravity effect of centrifuging may also be obtained by pumping the slurry through a hydrocyclone. These have been highly developed in recent years and widely used in liquid separations. Full discussions are given in the book by Rietema and Verver entitled "Cyclones in Industry," Amsterdam, and New York, 1961, the contents of which are included herein by reference.

When enhanced gravity is used to obtain stratification and separation, as by using centrifuges or hydrocyclones, it is in general not necessary to wait for the 24-hour period described earlier in connection with simple gravity settling. Some standing prior to centrifuging or hydrocycloning is often advisable, as for example for one-fourth to 1 hour, since this enables separation to take place even though at that stage it is only on a less than macroscopic scale. It need hardly be added that when I speak of causing the reaction mixture to be acted upon by gravity I contemplate that the gravitational field may be that provided naturally at the surface of the earth, or the enhanced field provided by centrifugal action, whether in a rotating centrifuge or in a hydrocyclone, as already described. As is well known, the intensity of the gravitational field of the earth is measured as an acceleration, which is identical in nature but not necessarily in value with the acceleration produced by centrifuging.

My inventive process is also applicable when instead of the calcium compounds described herein, other alkaline earth metal cations have been substituted for the calcium, and in particular, magnesium and barium.

I wish it to be understood that I do not desire to be limited to the exact details of procedure and operation which have been described, for obvious modifications will occur to a person skilled in the art.

Having described the invention, I claim:

1. A process for the recovery of calcium mahogany sulfonate from a mixture of said sulfonate with calcium compounds of the class consisting of calcium oxide, calcium hydroxide, and calcium carbonate and mixtures thereof which comprises the steps of adding to said mixture an acid selected from the class consisting of hydrochloric, nitric, and trichloroacetic, in a quantity sufficient to neutralize said calcium compounds and to form an aqueous solution of the salt formed by said calcium compounds and said acid;

causing the reaction mixture so formed to be acted upon by gravity until three layers are formed consisting of a lighter layer of calcium mahogany sulfonate, an intermediate layer of a brine of said salt, and a heavier layer of non-solubilized solids in said brine; thereafter removing said lighter layer of calcium mahogany sulfonate.

2. The process in accordance with claim 1 wherein said gravity is provided by a centrifuge.

3. The process in accordance with claim 1 wherein said acid is hydrochloric acid.

4. The process in accordance with claim 1 wherein said acid is nitric acid.

5. The process of claim 1 which includes the additional steps of removing said non-solubilized solids from said heavier layer; washing said solids free of said brine; and drying said washed solids so as to provide them in condition for re-use as a filter aid.

* * * * *